Sept. 20, 1955  A. E. WILDE  2,718,297
CONVEYOR FOR DISH WASHING MACHINE
Filed June 1, 1953

INVENTOR.
ALEXANDER E. WILDE.
BY Albert Sperry.
ATTORNEY

United States Patent Office 2,718,297
Patented Sept. 20, 1955

2,718,297
CONVEYOR FOR DISH WASHING MACHINE

Alexander E. Wilde, Little Silver, N. J., assignor to Faspray Corporation, Red Bank, N. J., a corporation of Delaware Application June 1, 1953, Serial No. 358,813

1 Claim. (Cl. 198—208)

This invention relates to dish washing machines and is directed particularly to equipment of the type used in hotels, restaurants and institutions wherein racks containing the dishes to be washed are moved through washing and rinsing chambers.

The means employed for moving racks of dishes through dish washing machines heretofore have generally included a pair of chains upon which the racks are placed and by which they are moved through the equipment. The chains themselves are supported on tracks or angle irons and pass about sprockets driven by a suitable motor. The wear on the chains as they drag along the tracks under the weight of the loaded racks is very severe and, as a result, they represent a substantial item in the cost and maintenance of the equipment. Moreover, the shafts by which the sprockets are driven must, of course, be mounted in suitable bearings which are contacted repeatedly by dirt and food products from the dishes and, therefore, soon become fouled and impaired. It is impossible to effectively lubricate the bearings, chains and tracks to reduce the wear due to the continued action of hot water and detergents or soap which wash over the surfaces and dissolve out any lubricant applied. The bearings are further subjected to varying and unusual loads depending upon the number and weight of the dishes being washed and the differences in loading or drag to which the chains at opposite sides of the equipment are subjected. The friction and wear thus imposed on the various elements of the assembly result in greatly increased load on the motor by which they are driven and cause frequent breakdowns of the equipment.

In accordance with the present invention, these objections to prior constructions are overcome and means are provided whereby a single chain may be used to move the racks through the equipment and the wear on the chain and the load on the equipment is reduced so that long, continued and consistent operation is possible. These advantages are preferably attained by providing spaced parallel tracks which support the dish carrying racks while using a single centrally located chain with lugs thereon for moving the racks along the tracks. The chain is suspended between its ends or between spaced sprockets so that it does not receive wear from the tracks. The shaft by which the sprocket and chain of the conveying means are driven is mounted in open type self cleaning bearings which automatically adjust themselves to varying loads and temperatures and requiring no lubrication under continued and severe usage.

One of the objects of the present invention is to provide dish washing machines with novel means for supporting and moving racks of dishes through the equipment.

Another object of the invention is to provide novel bearing assemblies for mounting the shafts by which the sprockets, chains or conveying means used in the equipment are driven.

A further object of the invention is to provide a mounting for the sprocket shaft of a dish washing machine which will permit automatic adjustment of the shaft under varying conditions of load and temperature.

These and other objects and features of the present invention will appear from the following description thereof in which reference is made to the figures of the accompanying drawing.

Figure 1:
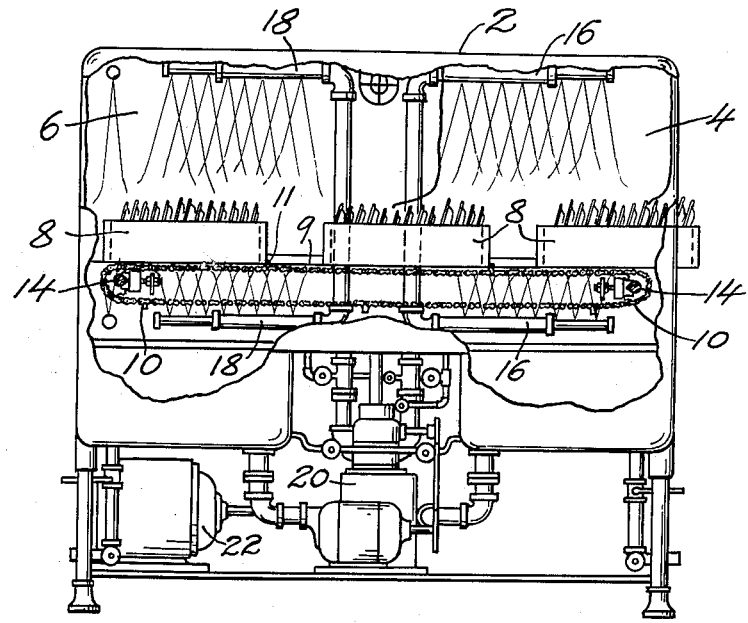
Fig. 1 is a vertical sectional view through a typical dish washing machine embodying the present invention.
Figures 2, 3:
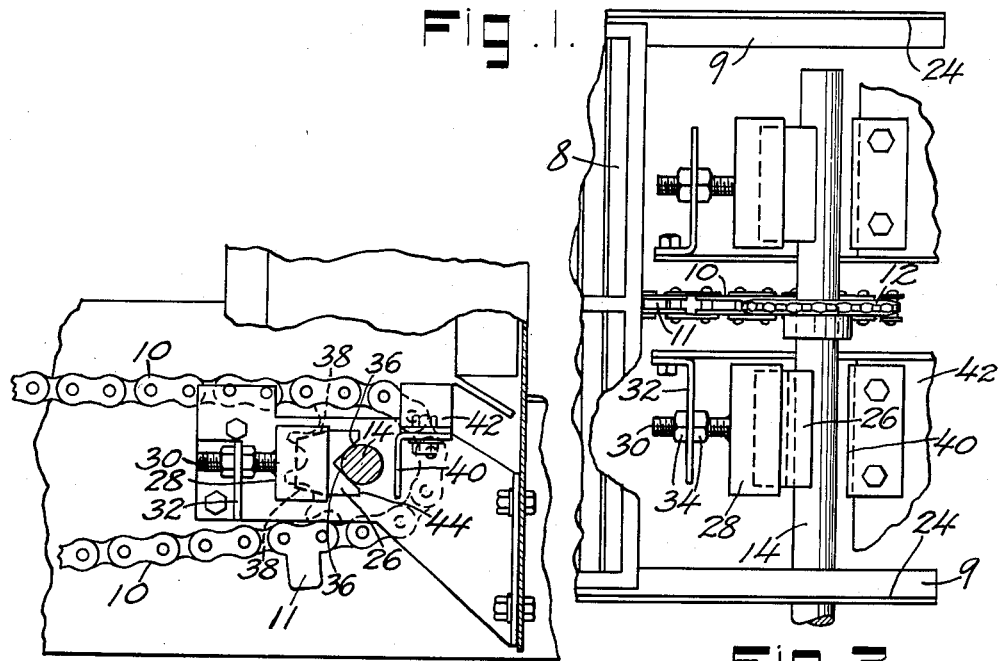
Fig. 2 is an enlarged end view of one of the bearings employed in the construction of Fig. 1.
Fig. 3 is a top plan view of a portion of the equipment illustrated in Fig. 1.

In that form of the invention chosen for purposes of illustration in the drawing, the dish washing machine comprises a housing 2 having a washing chamber 4 and a rinsing chamber 6 through which racks 8 of dishes are moved along the parallel supporting tracks 9 located adjacent the side walls of the housing in position to support the opposite edges of the racks as they move through the washing and rinsing chambers. The racks are advanced by means of a centrally located conveying chain 10 provided with lugs 11 which are arranged at spaced points lengthwise of the chain and project upward therefrom to engage the successive racks of dishes and push them along the tracks 9. The chain 10 is driven by a sprocket 12 on shaft 14. Hot water containing a soap or detergent is sprayed onto the dishes in the chamber 4 through a spray head 16, whereas hot rinsing water is sprayed onto the dishes in chamber 6 through the spray head 18. The water is supplied to the heads 16 and 18 by suitable pumping means indicated at 20 and driven by a motor 22. A second motor may be used to drive the sprocket and chain, or if desired, they may be driven from the pump shaft or otherwise to advance the chains 10 and move the racks 8 through the housing 2 at the desired speed for assuring effective washing and rinsing of the dishes.

The tracks 9 are preferably in the form of stainless steel angle irons or are otherwise provided with upwardly projecting side portions 24 which prevent lateral displacement of the tracks so that the equipment can be used on ships and elsewhere without danger of the racks shifting sideways or jamming as they travel through the equipment. Moreover, angular or irregular movement of the racks or lateral shifting of the centrally located chain as a ship lurches about will still allow the lugs to remain in engagement with the racks instead of slipping off the edge of a rack as is possible when the chains run along marginal tracks. The lugs 11 on the chains also prevent a careless operator from pushing the racks through the washing and rinsing chambers in such a hurried manner as to result in improper cleansing of the dishes. Instead, each track is moved deliberately and at the proper speed through the equipment for delivery of the dishes at the opposite end in a fully washed and sanitary condition. By suitable reversal of the driving connections, the equipment also may be driven from either right to left or from left to right to cooperate with other existing installations in a kitchen or galley.

The shaft 14 by which the sprocket 12 is driven is supported by bearing blocks 26 which are mounted adjacent the sprocket 12 and on opposite sides thereof or elsewhere as required. Each bearing block is mounted in an adjustable bearing carrier 28 provided with an adjusting pin 30 which extends to the rear from the carrier 28 and is held in adjusted position on a supporting web 32 by means of lock nuts 34.

The bearing block is provided with outwardly facing inclined bearing surfaces 36 which may be positioned at right angles to each other to engage and position the shaft 14. The shaft is held against the surfaces 36 by the chain 10 and is otherwise exposed to permit washing away of any dirt or material coming into contact with the shaft by the water and detergent flowing downward thereover. The bearing block fits within the carrier 28 and may be tapered or otherwise formed, as shown at 38, to hold the block securely in place and prevent tilting, cocking or undesired movement of the bearing block under the forces applied thereto by the shaft during rotation.

The shaft is prevented from falling away from the bearing block on loosening of the chain 10 by means of a retaining plate 40 mounted on the frame 42 and spaced from the outer face 44 of the bearing block a distance less than the diameter of the shaft 14.

Any desired number of bearings of the type described may be provided for each of the shafts 14 and they preferably are located close to and on opposite sides of the sprocket 12. Since these bearings are open at one side, they are self cleaning and any material accumulating on the shaft will be freely washed away from the shaft and bearing by the water or washing liquid spraying downward over the bearing. The shaft 14 further is capable of adjusting itself in the open side of the V-shaped bearing block so that severe and uneven loading of the shaft may take place and yet the shaft will automatically adjust its position with respect to the bearing surfaces 36 to accommodate itself to any unusual strains or conditions of operation. The frames embracing the sides of the bearing members preferably afford a snug fit which prevents undue wobbling or play of the bearing blocks or shaft, whereas binding of the shaft cannot occur due to the freedom of adjustment permitted with the construction provided.

In the event any one or more of the bearing blocks should receive undue wear, a new bearing block may be easily inserted into the bearing carrier 28. Such substitution can be accomplished readily by loosening lock nuts 34 and drawing back the bearing carrier until it is moved far enough away from the retaining plate 40 to permit removal of the bearing block 26. A new bearing block may then be inserted into the carrier 28 whereupon the adjusting pin 30 is secured in the proper position to apply the desired tension upon the conveying chain 10. The lock nuts 34 are then tightened to secure the bearing carrier 28 in place and thereafter operation of the equipment may continue without further delays or interruptions.

While the bearing block illustrated in the drawing presents a V-shaped bearing surface presenting two angularly disposed bearing surfaces 36, it will be apparent that the bearing surface may be semi-circular or arcuate in form and may be otherwise shaped to present an open, freely accessible surface from which dirt and impurities may be readily washed while the machine is in operation.

Although a particular embodiment of the present invention has been illustrated in the drawing, it will be apparent that numerous changes and modifications may be made in the form, construction and arrangement of the various elements, and in view thereof, it should be understood that the particular form of the invention shown in the drawing and described above is intended to be illustrative only and is not intended to limit the scope of the invention.

I claim:

A conveyor comprising a pair of spaced tracks, an endless chain located between said tracks, carrying means mounted on said chain for engaging racks of dishes on said tracks to move said racks along said tracks, a sprocket about the outer face of which said chain passes, a rotatable shaft upon which said sprocket is mounted, and a pair of spaced bearing assemblies mounted at either side of said sprocket adjacent the inner face of said shaft for supporting said shaft, each of said bearing assemblies comprising a bearing carrier having a recess formed therein, a bearing block removably carried in each of said recesses and protruding therefrom in the direction of said shaft, each bearing surface presenting fully exposed open sided bearing recesses for the reception of said shaft, a threaded adjusting pin projecting from the rear of said bearing carriers, means threadedly engaging said adjusting pin for adjusting said pin to cause said bearing carrier to be moved toward and from the axis of said shaft, means carried by said adjusting pin to lock said pin in any desired position, and means for retaining said shaft in the recesses of said bearing blocks.

References Cited in the file of this patent

UNITED STATES PATENTS

| 639,460 | Taintor | Dec. 19, 1899 |
| 1,000,974 | Anderson | Aug. 22, 1911 |
| 1,298,489 | Frelinghuysen et al. | Mar. 25, 1919 |
| 1,313,455 | Blakeslee | Aug. 19, 1919 |
| 1,406,465 | Lynch | Feb. 14, 1922 |
| 2,226,853 | Garbacz | Dec. 31, 1940 |
| 2,257,758 | Murch | Oct. 7, 1941 |